Feb. 8, 1927.
W. T. McLAUGHLIN
1,617,259
PIPE SUPPORT
Filed July 15, 1926
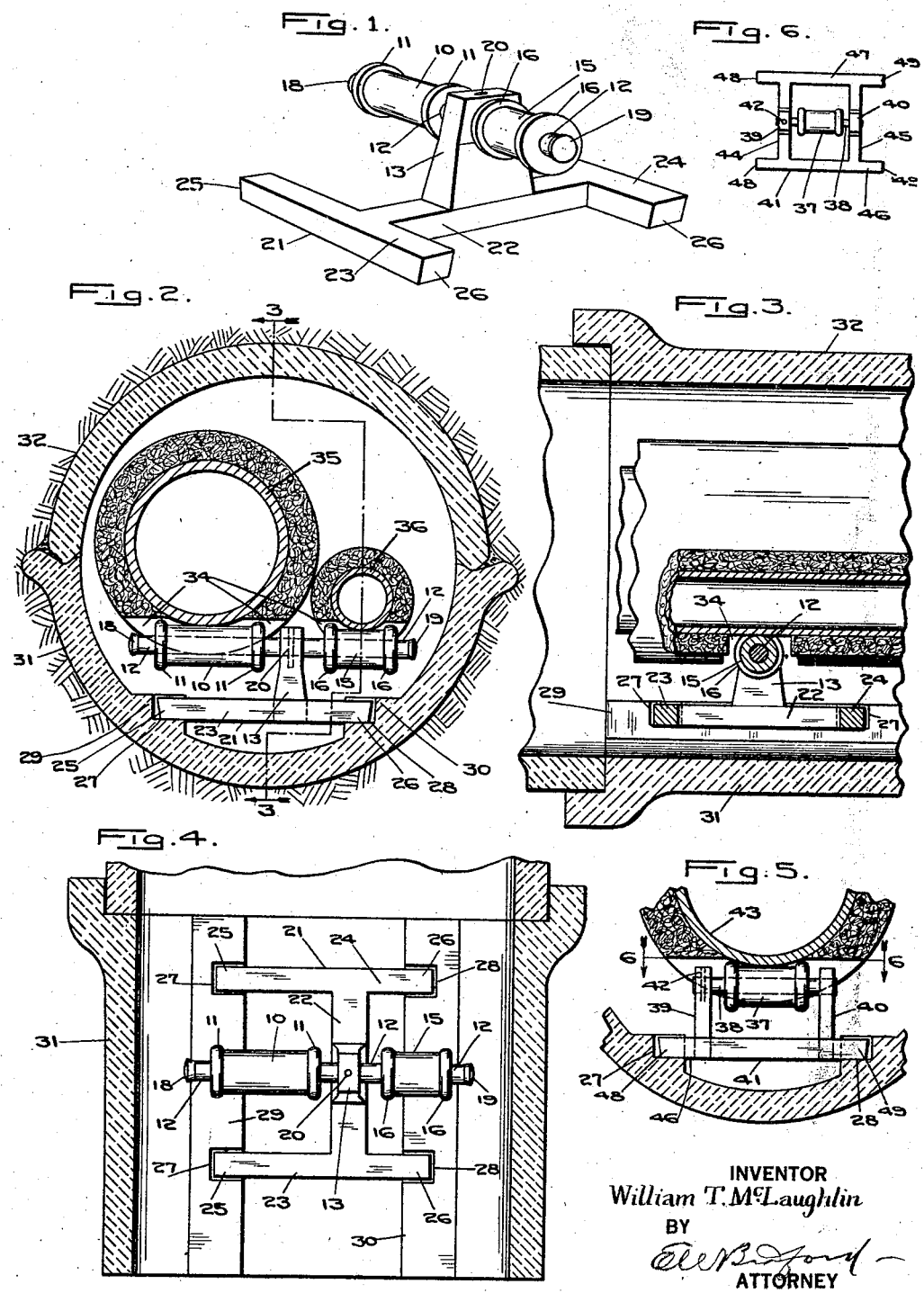
INVENTOR
William T. McLaughlin
BY
ATTORNEY

Patented Feb. 8, 1927.

1,617,259

UNITED STATES PATENT OFFICE.

WILLIAM T. McLAUGHLIN, OF INDIANAPOLIS, INDIANA.

PIPE SUPPORT.

Application filed July 15, 1926. Serial No. 122,720.

My invention delates to improvements in pipe supports such as are used to support steam pipes, water pipes and the like where the pipes are subject to expansion and contraction due to temperature changes of their contents.

The particular adaptation of my invention illustrated and described is for the purpose of supporting pipe within a tile conduit or tunnel underground although it is not restricted entirely to this arrangement.

In the form of my invention shown and described it is my object to simplify the construction; thereby lowering the cost of manufacture and installation over devices now in use and to provide: (1) for the lateral as well as longitudinal displacement of the pipe whether it is caused by temperature changes or deflections from other causes; (2) to accommodate various diameters of pipe and thicknesses of insulation or covering and (3) to provide for bringing the pipe into an accessible position while applying the covering or making a joint in the pipe line and returning it to its proper position thereafter.

Referring to the accompanying drawings, which are made a part hereof and on which similar reference characters indicate similar parts, Figure 1 is a perspective showing an assembly of the unit about which my invention centers, Figure 2 is a cross section of a conduit showing my device in place and supporting a steam pipe and a condensate return line, Figure 3 is a section taken on line 3—3 of Figure 2, Figure 4 is a plan view of the device in place, Figure 5 is a cross section of a conduit showing another form of my invention, and Figure 6 is a plan view taken on line 6—6 of Figure 5.

Referring to Figures 1, 2, 3, and 4, a spool or roller 10 having enlarged ends 11 is mounted on one end of a horizontally disposed stub-shaft 12 and to one side of a standard 13 through which the stub-shaft 12 is inserted.

A spool or roller 15 having enlarged ends 16 is mounted on the other end of stub-shaft 12 on the opposite side of standard 13 from spool 10.

The two ends of shaft 12 are upset or enlarged at 18 and 19 after spools 10 and 15 are mounted to prevent the spools from sliding off. Shaft 12 is secured endwise in standard 13 by a pin 20 and in such a position that there remains a certain amount of side play for each of the spools 10 and 15. In the drawings the spool 15 is somewhat shorter than spool 10 likewise is the end of shaft 12 shorter at spool 15 than at spool 10.

Standard 13 is part of a bracket or spider 21, the horizontal base of which is in the form of a letter H and from the cross-bar 22 of which the standard 13 is extended in an upright position. The lateral bars 23 and 24 joined by bar 22 are so spaced apart that their ends 25 and 26 register with and rest in notches or pockets 27 and 28 moulded in ledges 29 and 30 on the inside and near the bottom of a section of a conduit tile 31.

In the form shown tile 31 is made with its upper half 32 detachable thereby permitting the lower half to be placed in a trench whereupon the pipe support is set in place in the notches 27 and 28. The pipe is then placed on top of the spools 10 and 15 in readiness for assembling the pipe joints and for covering with insulation after which the upper half 32 is replaced and sealed. It is during the making of the pipe joints and the covering of the pipe that the shifting of the pipe from side to side becomes sometimes necessary for which provision has been made in my device in the end play of spools 10 and 15 on shaft 12.

Referring to Figures 2 and 3 it is seen that the pipe rests directly upon the spools 10 and 15 and the covering 33 is omitted at 34 to permit this, the portion omitted being long enough along the line of the pipe to allow for the longitudinal movement of the pipe on the rollers 10 and 15 due to its expansion and contraction. Where there is an installation of a steam pipe 35 and its condensate return pipe 36 the latter is considerably smaller than the former. Therefore the spools 10 and 15, shaft 12 and bracket 21 are proportioned to accommodate this condition so that the pipe may be properly located within conduit 31 as can be plainly seen in Figure 2.

When there is a single pipe to be installed a support of a modified form is used as shown in Figures 5 and 6. One roller 37 is used, instead of two as in the form described, and is mounted centrally upon a shaft 38 being supported in uprights 39 and 40 of bracket 41. A pin 42 for securing the shaft 38 endwise is inserted in one upright 39. End play is allowed between spool 37 and uprights 39 and 40 to permit the free sidewise movement of pipe 43. Uprights 39 and 40 are extended upwards from cross-bars 44 and 45 the latter joining the lateral bars 46 and 47 the ends 48 and 49 of which rest in the notches 27 and 28 in the tile in a similar manner to bracket 21.

The spools and shafts are lubricated to aid in their free movement and to prevent the interference of corrosion. Any moisture which may enter the tile collects in the bottom and below the brackets out of range of the spools.

Having thus fully described my said invention, what I claim as new and desire to secure by Letters Patent, is:

1. In a pipe support, a bracket, a stub-shaft mounted horizontally in said bracket and flanged rollers mounted on the stub-shaft, substantially as set forth.

2. In a pipe support, a bracket, a stub-shaft held horizontally near its center in said bracket and flanged rollers adapted to carry pipes mounted on each end of the stub-shaft, substantially as set forth.

3. In a pipe support, a stub-shaft, a bracket, said stub-shaft mounted horizontally in said bracket and extending to each side of said bracket and a flanged roller mounted on each end of said stub-shaft, each roller adapted to carry the weight of a pipe, substantially as set forth.

4. In a pipe support, a stub-shaft, a bracket, said stub-shaft mounted and secured horizontally in said bracket and a flanged roller mounted on each end portion of said stub-shaft, the extremities of said stub-shaft being upset to retain said rollers and the end portions of the stub-shaft being longer than said rollers, substantially as set forth.

5. In a pipe support, a stub-shaft, a bracket, said stub-shaft secured horizontally in and extending from the side of said bracket, a roller rotatably mounted on said stub-shaft, said bracket being joined to the cross-bar of a base having the shape of a letter H, horizontally disposed, said shaft and roller being above and between and parallel to the two parallel bars of said base, substantially as set forth.

6. In a pipe support, a horizontal pin, a flanged roller rotatably and slidably mounted on said pin, said pin secured in a bracket, said bracket being extended upwardly from a bar transversely disposed with reference to said pin and roller, and said transverse bar joining two parallel bars, and said parallel bars having feet forming extensions, substantially as set forth.

In witness whereof, I have hereunto set my hand at Indianapolis, Indiana this 29th day of June, A. D. nineteen hundred and twenty-six.

WILLIAM T. McLAUGHLIN.